(12) United States Patent
Ikeda et al.

(10) Patent No.: US 11,528,374 B2
(45) Date of Patent: Dec. 13, 2022

(54) IMAGE FORMING APPARATUS, METHOD OF CONTROLLING THE APPARATUS, AND STORAGE MEDIUM

(71) Applicant: CANON KABUSHIKI KAISHA, Tokyo (JP)

(72) Inventors: Atsushi Ikeda, Toride (JP); Takeshi Kogure, Toride (JP); Hiroaki Koike, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/883,615

(22) Filed: May 26, 2020

(65) Prior Publication Data
US 2020/0382662 A1 Dec. 3, 2020

(30) Foreign Application Priority Data
May 30, 2019 (JP) .............................. JP2019-101782

(51) Int. Cl.
*G06F 15/00* (2006.01)
*H04N 1/00* (2006.01)
(52) U.S. Cl.
CPC ....... *H04N 1/00503* (2013.01); *H04N 1/0022* (2013.01); *H04N 1/00474* (2013.01); *H04N 1/00482* (2013.01); *H04N 1/00506* (2013.01)
(58) Field of Classification Search
CPC ............. H04N 1/00503; H04N 1/0022; H04N 1/00474; H04N 1/00482; H04N 1/00506
USPC ........................................................ 358/1.15
See application file for complete search history.

(56) References Cited

U.S. PATENT DOCUMENTS

| | | | |
|---|---|---|---|
| 2013/0242342 A1* | 9/2013 | Kawakami | ......... H04N 1/00307 358/1.15 |
| 2016/0014298 A1* | 1/2016 | Hayashi | ............. H04N 1/00413 358/1.15 |
| 2018/0150262 A1 | 5/2018 | Koike | |

FOREIGN PATENT DOCUMENTS

| | | |
|---|---|---|
| EP | 3024215 A1 | 5/2016 |
| JP | H02-153677 A | 6/1990 |

* cited by examiner

*Primary Examiner* — Mark R Milia
(74) *Attorney, Agent, or Firm* — Canon U.S.A., Inc. I.P. Division

(57) ABSTRACT

An image forming apparatus includes a setting unit, a displaying unit, a receiving unit, and a printing unit. The setting unit accepts designation of source information from a user and set the accepted source information in association with an object. The displaying unit displays the object. The receiving unit receives image data from an external apparatus. The printing unit prints an image on a sheet based on the image data received by the receiving unit. Upon selection of the object displayed on the displaying unit, the printing unit prints an image on a sheet based on the image data from among the image data received by the receiving unit, that is received from an external apparatus having source information corresponding to the source information associated with the object.

13 Claims, 12 Drawing Sheets

| BUTTON NAME | SOURCE TELEPHONE NUMBER |
|---|---|
| XXX Co., Ltd. | 00-0000-0000 |
| XXX Co., Ltd. | 11-1111-1111 |
| Customer A | 22-2222-2222 |
| Customer A | 22-3333-3333 |
| Customer A | 44-4444-4444 |

| JOB ID | SOURCE TELEPHONE NUMBER |
|---|---|
| 001 | 00-0000-0000 |
| 002 | 11-1111-1111 |
| 003 | 22-2222-2222 |
| 004 | 12-3456-7890 |
| 005 | 98-7654-3210 |

# IMAGE FORMING APPARATUS, METHOD OF CONTROLLING THE APPARATUS, AND STORAGE MEDIUM

BACKGROUND

Field

The present disclosure relates to an image forming apparatus, a method of controlling the image forming apparatus, and a storage medium.

Description of the Related Art

A facsimile apparatus is disclosed in Japanese Patent Laid-Open No. 2-153677, which acquires the telephone number of a source in facsimile (FAX) communication from a transmitting station information (TSI) signal and, if the acquired telephone number of the source coincides with a telephone number that is stored in advance, does not immediately print image data received in the FAX communication and accumulates the image data in a confidential box. In the facsimile apparatus disclosed in Japanese Patent Laid-Open No. 2-153677, it is necessary to input the number of the confidential box and a password to print the image data accumulated in the confidential box.

In an image forming apparatus in related art, in which image data received in the FAX communication is stored in a box before being printed, it is necessary for a user to specify an arbitrary box and to issue a print instruction, in addition to the specification, in order to print the image data. Accordingly, the operation by the user is troublesome.

Also with the technology disclosed in Japanese Patent Laid-Open No. 2-153677, although the image data from a source that is not intended by the user is not printed, it is necessary for the user to specify an arbitrary box and to issue a print instruction, in addition to the specification, in order to print the image data. Accordingly, the operation by the user is troublesome.

SUMMARY

The present disclosure addresses reducing the operation by the user, which concerns the instruction to print image data that is received.

According to an aspect of the present disclosure, an image forming apparatus includes a setting unit configured to accept designation of source information from a user and set the accepted source information in association with an object, a displaying unit configured to display the object, a receiving unit configured to receive image data from an external apparatus, and a printing unit configured to print an image on a sheet based on the image data received by the receiving unit, wherein, upon selection of the object displayed on the displaying unit, the printing unit prints an image on a sheet based on the image data, from among the image data received by the receiving unit, that is received from an external apparatus having source information corresponding to the source information associated with the object.

Further features of the present disclosure will become apparent from the following description of exemplary embodiments with reference to the attached drawings.

DESCRIPTION OF THE EMBODIMENTS

Figure 1:
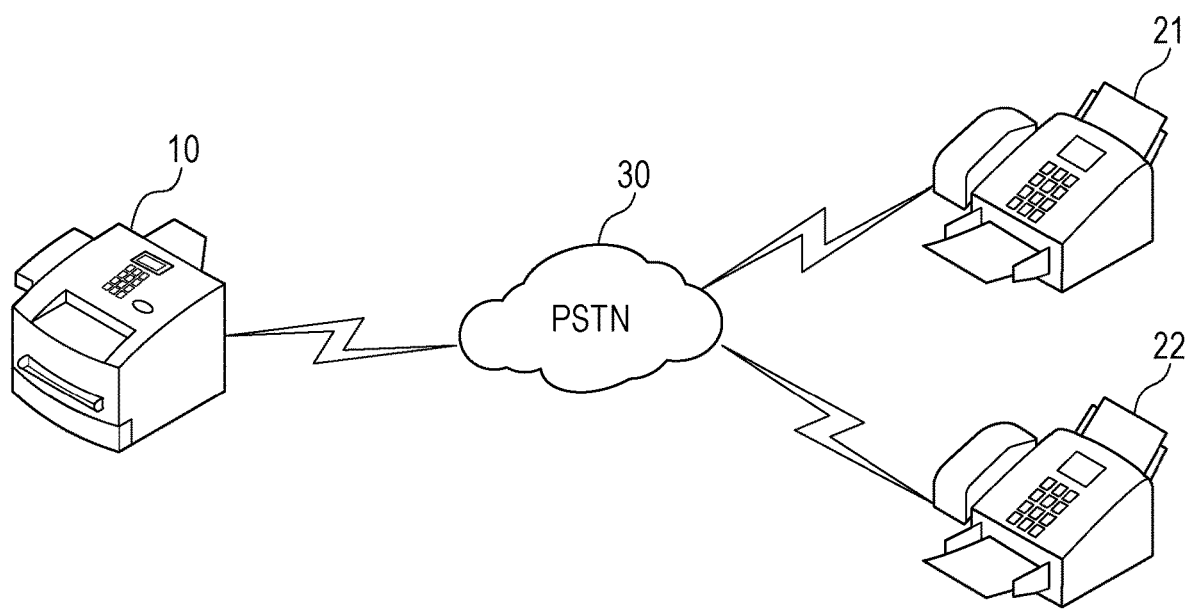
FIG. 1 illustrates an example of the configuration of an image data transmission-reception system.

Embodiments of the present disclosure will herein be described with reference to the drawings. The configurations in the embodiments described below are only examples and the present disclosure is not limited to the configurations illustrated in the drawings. Each of the embodiments of the present invention described below can be implemented solely or as a combination of a plurality of the embodiments or features thereof where necessary or where the combination of elements or features from individual embodiments in a single embodiment is beneficial.

First Embodiment

FIG. 1 illustrates an example of the configuration of an image data transmission-reception system. A multifunction peripheral (MFP) 10, which is an image forming apparatus, is connected to, for example, a facsimile (FAX) apparatus 21 and a FAX apparatus 22, which are external apparatuses, over a public switched telephone network (PSTN) 30. The MFP 10 is capable of communicating with the FAX apparatuses 21 and 22 using FAX communication. As described below, the MFP 10 receives FAX data (image data) transmitted from an apparatus, such as the FAX apparatus 21 or the FAX apparatus 22, and prints an image on a sheet based on the received FAX data.

Figure 2:
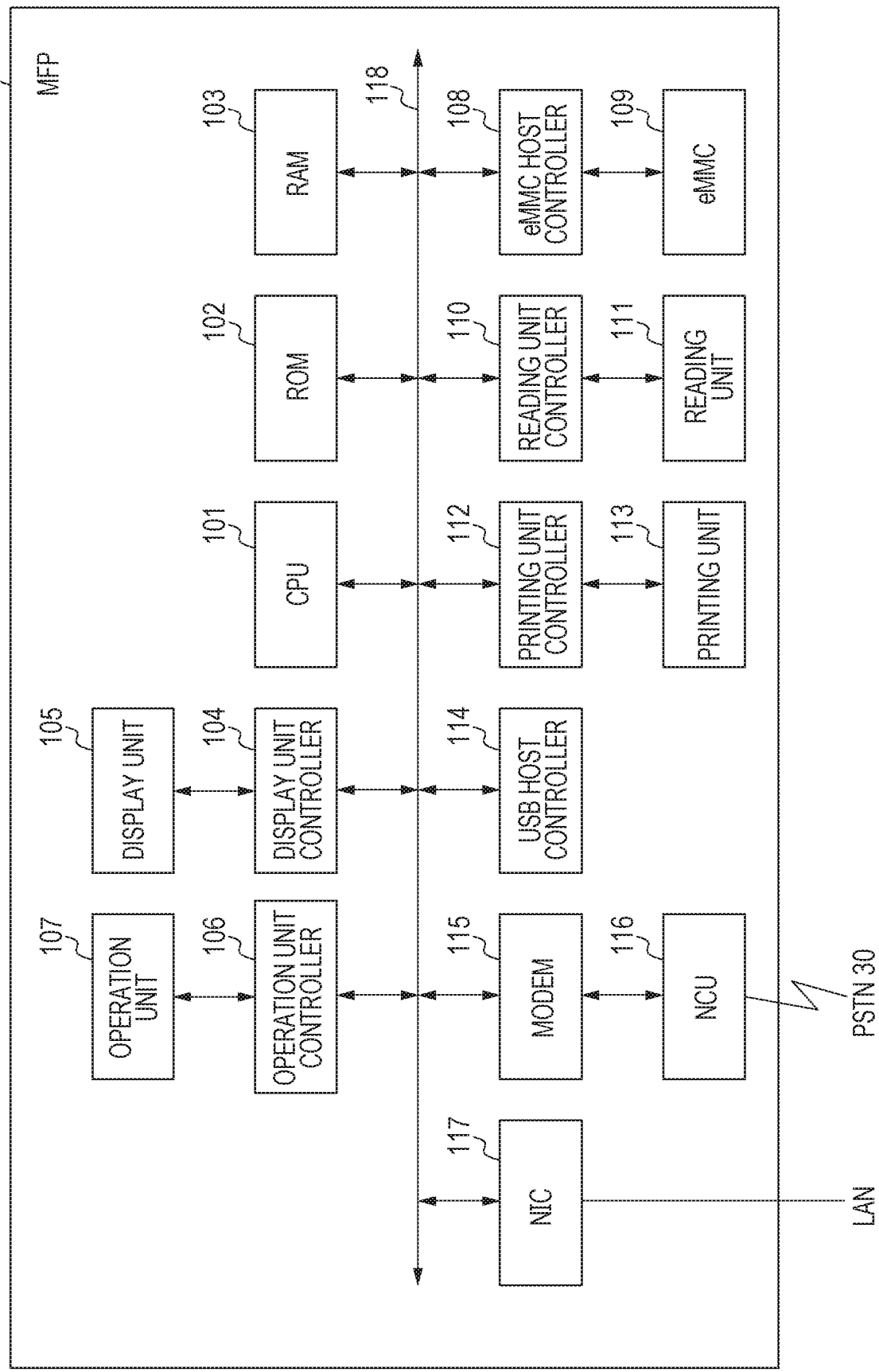
FIG. 2 illustrates an example of the hardware configuration of an MFP.

FIG. 2 illustrates an example of the hardware configuration of the MFP 10. Referring to FIG. 2, the MFP 10 includes a central processing unit (CPU) 101, a read only memory (ROM) 102, a random access memory (RAM) 103, a display unit controller 104, a display unit 105, an operation unit controller 106, and an operation unit 107. In addition, the MFP 10 includes an embedded multimedia card (eMMC) host controller 108, an eMMC 109, a reading unit controller 110, a reading unit 111, a printing unit controller 112, and a printing unit 113. Furthermore, the MFP 10 includes a universal serial bus (USB) host controller 114, a modulator-demodulator (MODEM) 115, a network control unit (NCU) 116, and a network interface card (NIC) 117.

The CPU 101 controls the various hardware components 102 to 117 composing the MFP 10 via a system bus 118 to realize the respective functions of the MFP 10. Upon supply of electric power, the CPU 101 executes a boot program stored in the ROM 102. Commonly, the boot program loads a main program stored in a specific area of the eMMC 109 into the RAM 103 and jumps to the head of the loaded main program.

The ROM 102 stores programs and a variety of data used by the CPU 101. The RAM 103 functions not only as a location in which the main program is loaded but also as a working area of the main program and so on.

The display unit controller 104 controls a drawing process in the display unit 105. The display unit 105 is a full-bitmap liquid crystal display (LCD) of a wide video graphics array (WVGA) size. The operation unit controller 106 controls an input from the operation unit 107. The operation unit 107 is a user interface for using the MFP 10 and accepts an operation and an input as, for example, a touch panel arranged over the display unit 105. In addition, the operation unit 107 has hard keys and accepts an operation and an input by a user with the hard keys. The display unit 105 and the operation unit 107 in the MFP 10 in the first embodiment may be externally connected as a display device and an operation device, respectively.

The reading unit 111 reads an original document. The reading unit 111 has a glass surface and a platen (not illustrated) that presses the original document and is capable of reading the original document one by one each time depression of a Start key of the operation unit 107 is accepted. In addition, the operation unit 107 has an automatic document feeder (ADF) (not illustrated) and is also capable of automatically and sequentially reading multiple original documents in response to one depression of the Start key of the operation unit 107. The reading unit 111 is connected to the reading unit controller 110 and the CPU 101 controls the operation of the reading unit 111 with the reading unit controller 110.

The printing unit 113 prints an image on a sheet using an electrophotographic method. The printing unit 113 is connected to the printing unit controller 112 and the CPU 101 controls the printing unit 113 with the printing unit controller 112. In addition, the printing unit 113 prints an image on a sheet based on image data included in a print job received via the NIC 117. The printing unit 113 is not limited to the use of the electrophotographic method and may print an image on a sheet using an ink-jet method.

The USB host controller 114 performs protocol control of a USB and mediates access to a USB device, such as a USB memory (not illustrated).

The MODEM 115 performs modulation and demodulation of a signal, which are necessary for the FAX communication. The MODEM 115 is connected to the NCU 116. The signal modulated in the MODEM 115 is transmitted to the PSTN 30 through the NCU 116. The NCU 116 performs, for example, transmission and reception of a dial signal.

The NIC 117 bidirectionally exchanges data with a mailer or a file server over a local area network (LAN). In addition, the NIC 117 bidirectionally exchanges data with, for example, a Web server. The NIC 117 may be an NIC for connection to a wired LAN or may be an NIC for connection to a wireless LAN.

Although the MFP 10 of the first embodiment includes the eMMC 109 as a storage, the MFP 10 may include a hard disk drive (HDD), a solid state drive (SSD), or the like. The CPU 101 controls the eMMC 109 with the eMMC host controller 108.

The CPU 101 in the MFP 10 controls the operation of the MFP 10 in accordance with a control program in the MFP 10. More specifically, the CPU 101 executes an operating system (OS) that controls the MFP 10 and a driver program for controlling a hardware interface. Then, an application program and so on arranged on the OS cooperate with each other to perform and control a function desired by the user. The OS and the various programs are stored in the ROM 102 and are read out from the ROM 102 into the RAM 103 for execution.

Figure 3:
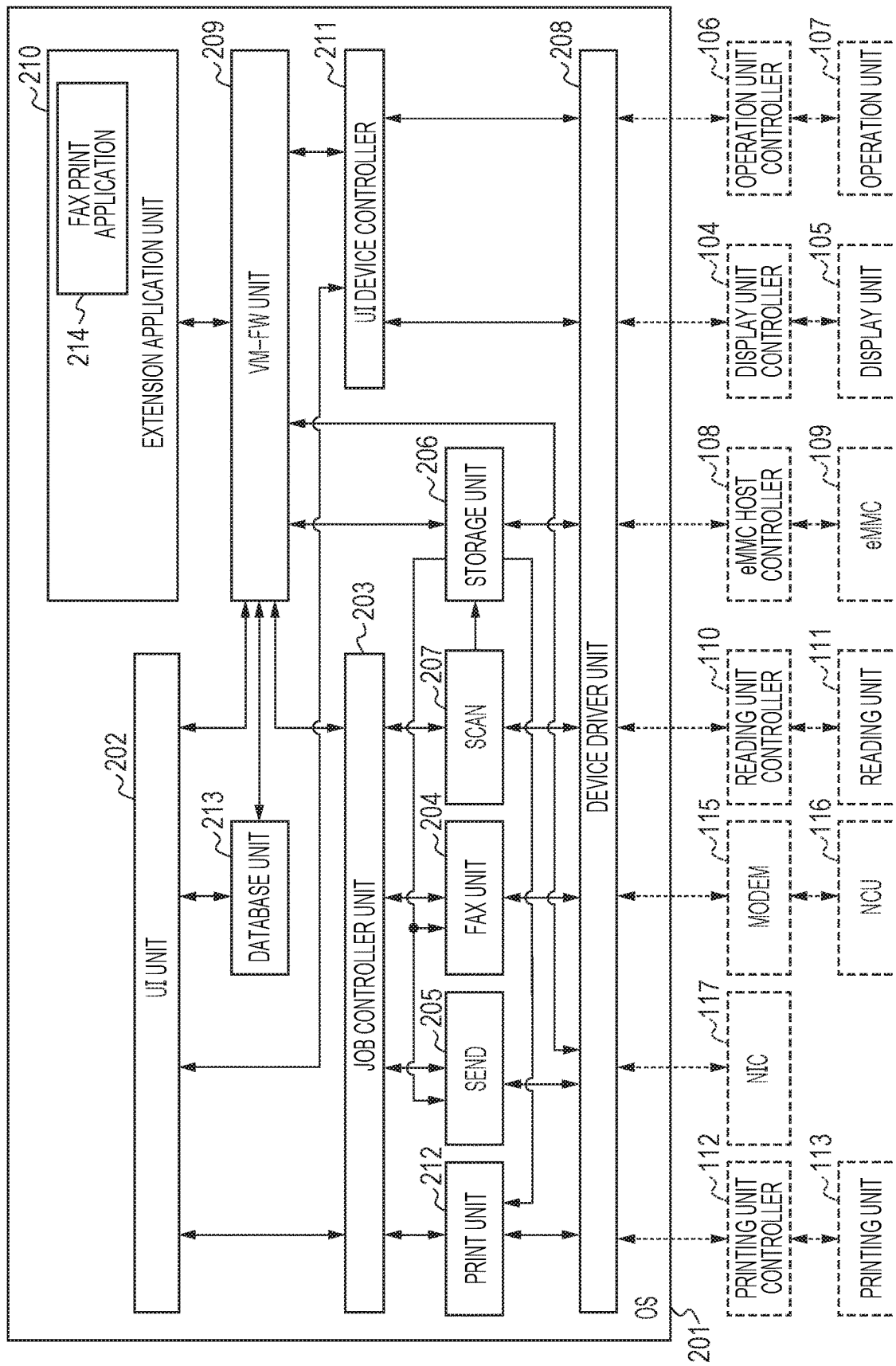
FIG. 3 illustrates an example of the software configuration of the MFP.

FIG. 3 illustrates an example of the software configuration of the MFP 10. The components indicated with solid lines in FIG. 3 are software modules that are realized by the CPU 101, which executes the main program loaded in the RAM 103.

Execution of the respective modules described below in the main program is managed and controlled by an operating system (OS) 201. A device driver unit 208 is included in the OS 201. The device driver unit 208 mediates communication with the hardware devices, such as the display unit controller 104, the operation unit controller 106, and the reading unit controller 110.

A user interface (UI) unit 202 supplies a variety of information to the user via the display unit 105 and the operation unit 107 and accepts various instructions from the user. Various settings for switching the operation of the MFP 10 are also capable of being changed with the UI unit 202. The various settings changed by the UI unit 202 are physically stored in the eMMC 109 via a database unit 213. The setting of a display language, which is one of the various settings, is also changed by the UI unit 202.

A job controller unit 203 accepts, for example, a copy job, a print job, or a facsimile job and controls execution of the accepted job.

A Scan button (FIG. 4) causes the MFP 10 to perform a transmission function 205 or a scanning process 207. A storage unit 206 is a software module that physically stores in the eMMC 109 and manages, for example, the image data to be subjected to FAX transmission and reception and data about the setting of an application or the like requested by an extension application unit 210.

Figure 8:
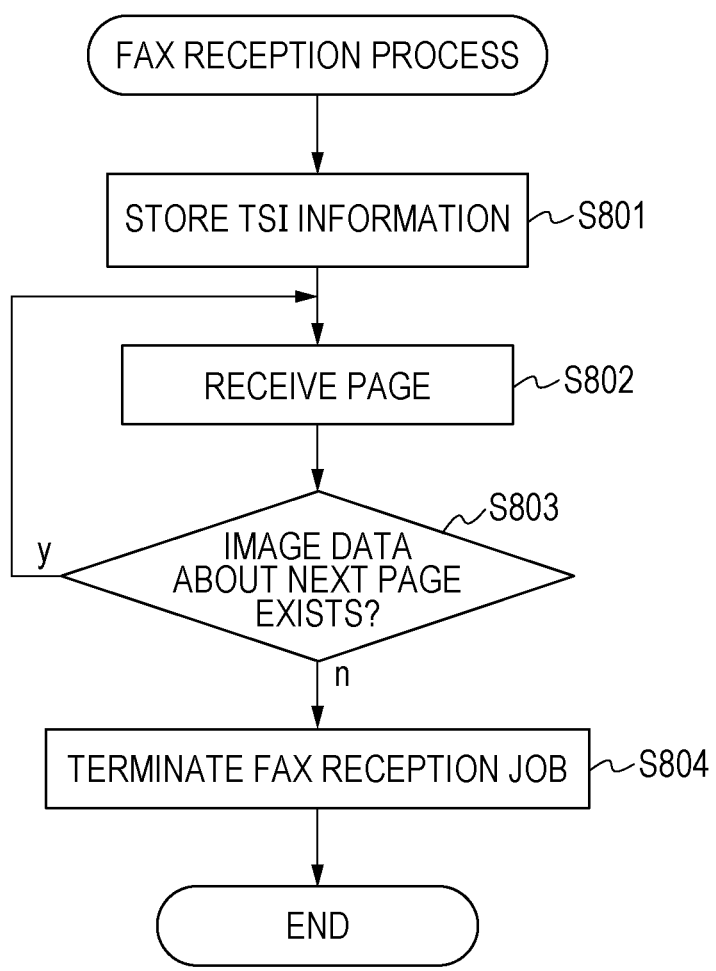
FIG. 8 is a flowchart illustrating an example of a process of storing FAX reception data.

For example, when a FAX unit 204 accepts a calling signal (CNG signal) indicating FAX transmission via the NCU 116 and the MODEM 115 in the MFP 10, the FAX unit 204 requests the job controller unit 203 to generate a FAX reception job. Upon acceptance of the request to generate the FAX reception job, a FAX reception process described below with reference to FIG. 8 is performed based on an instruction from the job controller unit 203. The image data received using the FAX communication is stored in the eMMC 109. The FAX image data stored in the eMMC 109 is read out by a print unit 212 and the printing unit 113 prints an image on a sheet based on the FAX image data under the control of the CPU 101 via the printing unit controller 112.

The FAX reception job is a process to receive the image data from a source using the FAX communication. The image data corresponding to multiple pages is capable of being received by executing one FAX reception job.

The MFP 10 includes a virtual machine-framework (VM-FW) unit 209. The extension application unit 210 holds multiple applications from, for example, an arbitrary program that is stored in the eMMC 109 and that is described in a script language. For example, Java (registered trademark), which is an interpreter that interprets and executes byte codes, or a language system, such as Lua, may be used.

The VM-FW unit 209 has a role to install or uninstall an arbitrary program described in the script language or a certain high-level language into or from the extension application unit 210. Concurrently, status information about the application that is installed, indicating whether the application is valid or invalid, is stored in the eMMC 109. If an archive resulting from compression of multiple pre-installed applications exists on the ROM 102, the VM-FW unit 209 also has a capability to install the archive in the extension application unit 210 while decompressing the archive if needed.

In addition, the VM-FW unit 209 has a role to, for example, adjust a function realized by an arbitrary program installed in the extension application unit 210 and an existing function. When the CPU 101 executes the VM-FW unit 209, the VM-FW unit 209 interprets the content while loading the script language of the corresponding application in the RAM 103 upon reception of selection of a button displayed in the display unit 105. The MFP 10 is capable of easily realizing an arbitrary function, such as a FAX print application 214, while keeping the install ability of the function in the above manner. Furthermore, the VM-FW unit 209 refers to or changes the values of the various settings in the database unit 213 in response to a request from an arbitrary program installed in the extension application unit 210.

A UI device controller 211 is software that mediates output of a variety of information to the display unit 105 by the UI unit 202 and the extension application unit 210. In addition, the UI device controller 211 is software that mediates transmission of an operation by the user with the operation unit 107 to the UI unit 202 and the extension application unit 210.

In an image forming apparatus in the related art, in which image data received in the FAX communication is stored in a box before being printed, it is necessary for the user to specify an arbitrary box and to issue a print instruction, in addition to the specification, in order to print the image data. Accordingly, the operation by the user is troublesome.

Also with the technology disclosed in Japanese Patent Laid-Open No. 2-153677, although the image data from a source that is not intended by the user is not printed, it is necessary for the user to specify an arbitrary box and to issue a print instruction, in addition to the specification, in order to print the image data. Accordingly, the operation by the user is troublesome.

In order to address the above matters, it is possible to reduce the operation by the user, which concerns the instruction to print image data that is received by performing the following processes.

Figure 9:
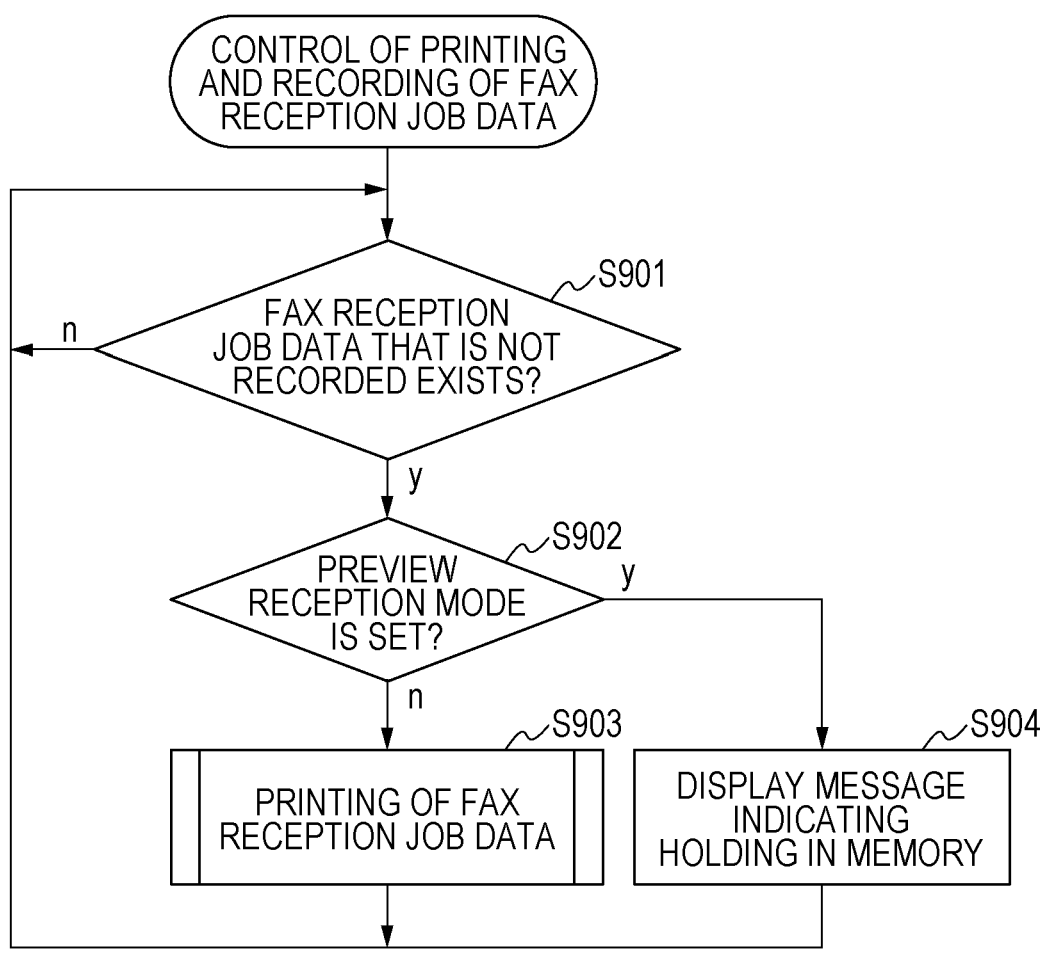
FIG. 9 is a flowchart illustrating an example of a process of controlling printing and recording of the FAX reception job data.

A flow of FAX one touch print will now be roughly described. First, the FAX data (image data) is received from an external FAX apparatus in accordance with a flowchart illustrated in FIG. 8. Then, a loop process illustrated in FIG. 9 is performed at certain intervals to determine whether the FAX data is stored.

Figure 10:
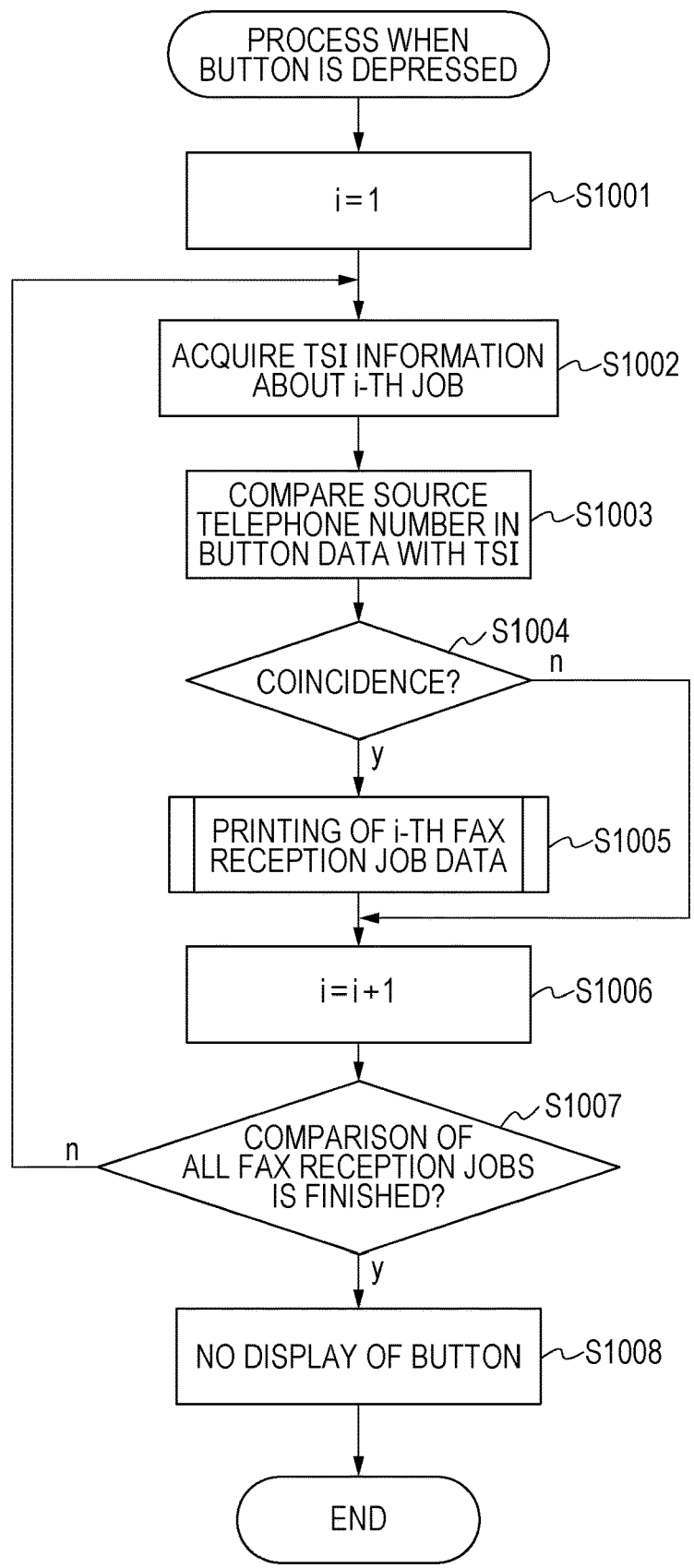
FIG. 10 is a flowchart illustrating an example of a FAX one touch print process.

At this time, the operation is varied based on whether a preview reception mode is set. If the preview reception mode is set, selection of a button by the user is awaited. If the preview reception mode is not set, the FAX data that is stored is printed according to a process illustrated in FIG. 7. When selection of a button by the user is awaited, a process illustrated in FIG. 10 is performed.

Figure 6:
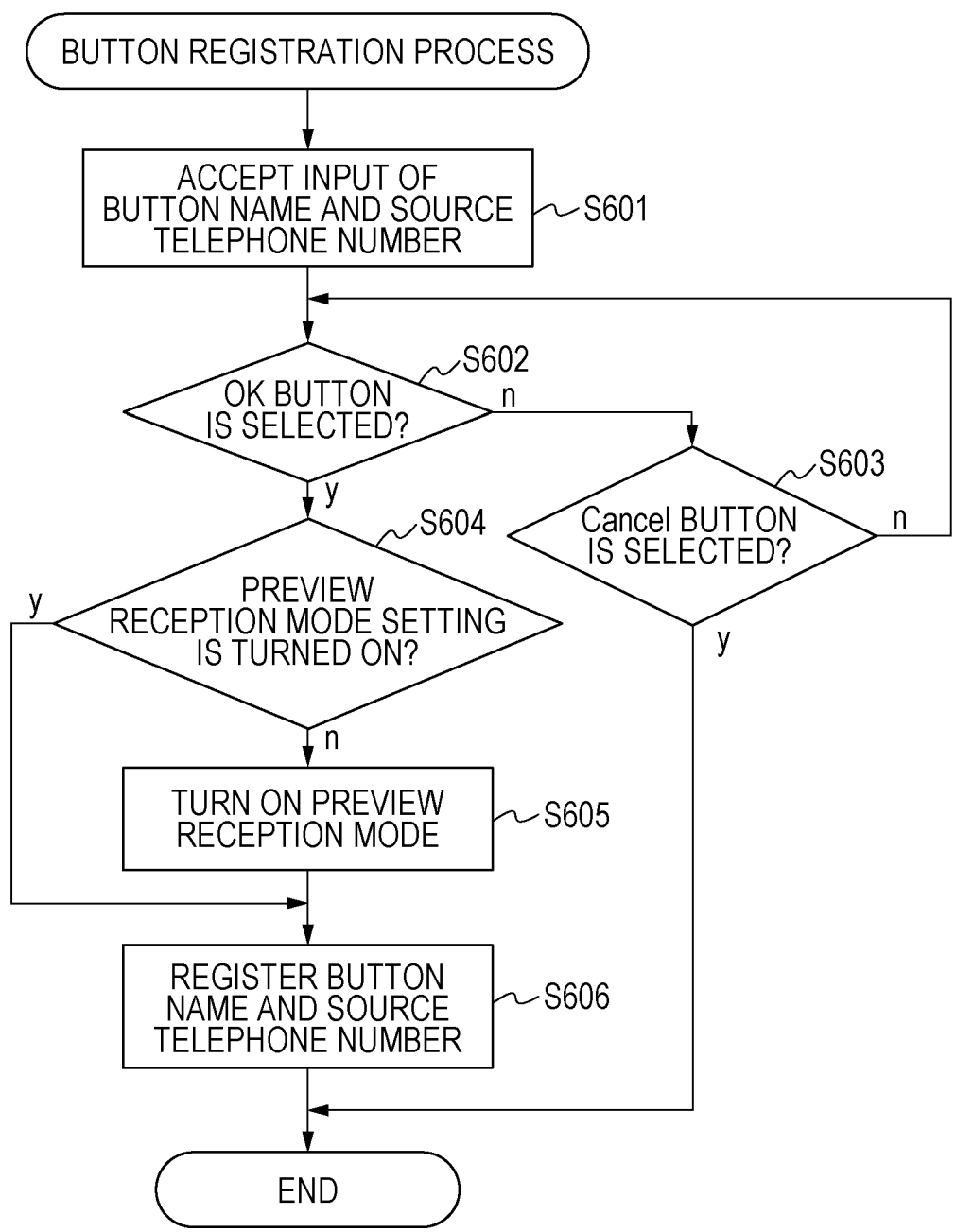
FIG. 6 is a flowchart illustrating an example of a button registration process.

FIG. 6 is a flowchart illustrating an example of a button registration process. The CPU 101 reads out the FAX print application 214 stored in the eMMC 109 into the RAM 103. Then, the process in the flowchart illustrated in FIG. 6, which is read out in the RAM 103, is interpreted by the CPU 101, which executes the VM-FW unit 209. The flowchart illustrated in FIG. 6 is started upon selection of button registration from a setup menu by the user with the operation unit 107. The button registration is also available through access to a Web page provided by the MFP 10 by the user using a Web browser.

Referring to FIG. 6, in Step S601, the CPU 101 accepts input of a button name and a source telephone number by the user via the operation unit 107 when a button registration screen is displayed in the display unit 105. An example of the button registration screen will now be described with reference to FIG. 5.

Figure 5:
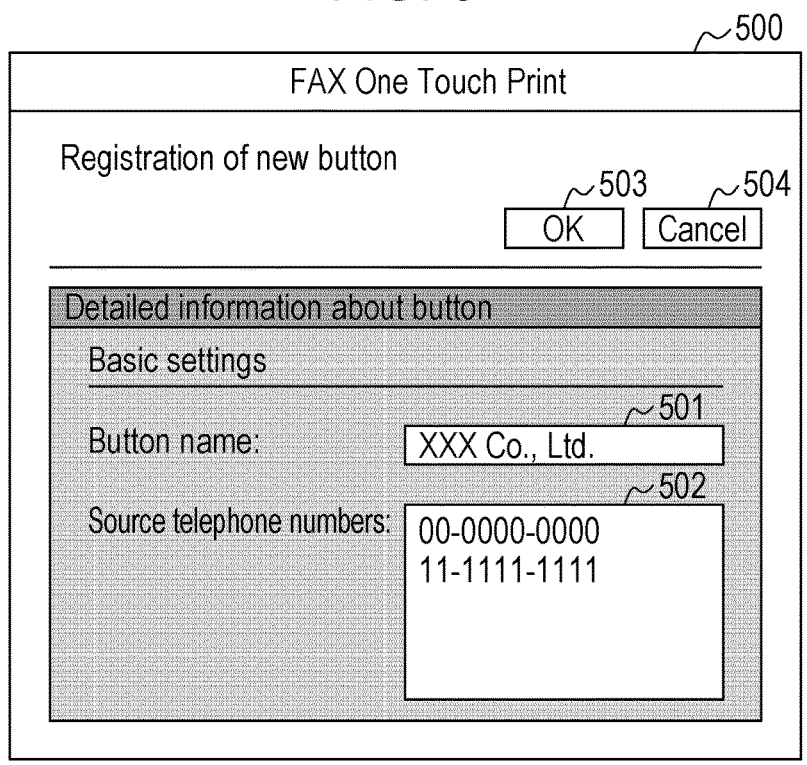
FIG. 5 illustrates an example of a button registration screen.

FIG. 5 illustrates an example of the button registration screen. A button registration screen 500 is an example of the screen displayed in the display unit 105 in the MFP 10.

An input field 501 is an object for setting the name of a button. Upon selection of the input field 501 by the user, a software keyboard (not illustrated) is displayed. The user is capable of inputting a button name using the software keyboard.

An input field 502 is an object for registering the source telephone number in the FAX image data, for which the printing unit 113 performs a printing process in response to selection of a button to be registered. When the input field 502 is selected by the user, the software keyboard (not illustrated) is displayed and the user is capable of inputting the telephone number using the software keyboard. The input into the input field 502 is not limited to the manual input by the user described above and the telephone number to be input into the input field 502 may be selected from the telephone numbers registered in advance in an address book in the eMMC 109 in the MFP 10. An arbitrary number of source telephone numbers can be registered using the input field 502.

An OK button 503 is an object for associating the value that is input at the time of selection with the button and storing the value associated with the button. In the example in FIG. 5, upon selection of the OK button 503, a button name "XXX Co., Ltd." and source telephone numbers "00-0000-0000" and "11-1111-1111" are stored in the eMMC 109 as button information.

A Cancel button 504 is a button for discarding the value that is input at the time of selection and closing the button registration screen.

Figures 13, 14A, 14B:
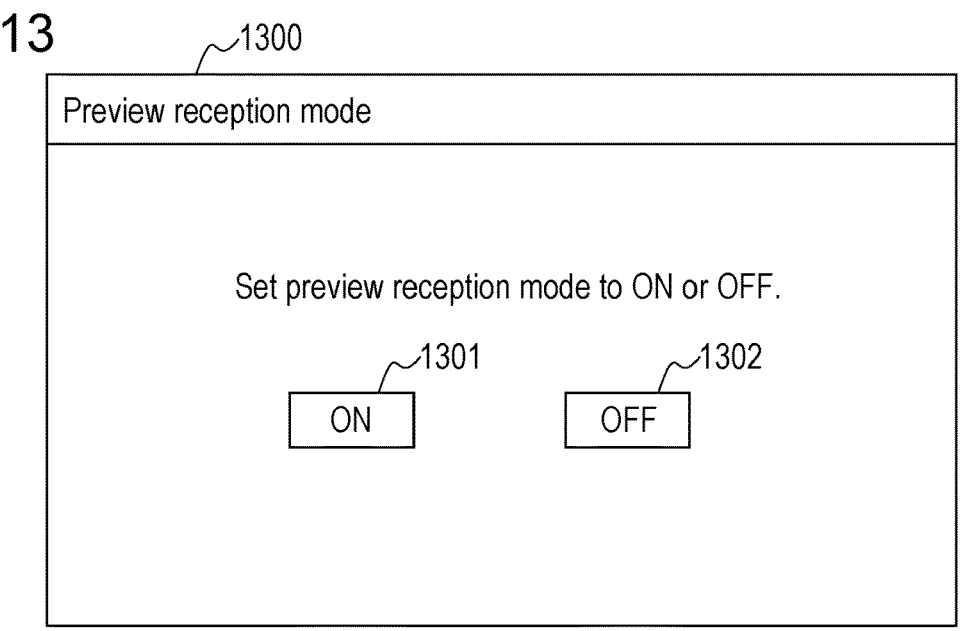
FIG. 13 illustrates an example of a setting screen of a preview reception mode.
FIG. 14A and FIG. 14B are tables indicating the correspondence between source telephone numbers and button names and the correspondence between source telephone numbers and job IDs, respectively.

The source telephone numbers and the button names set on the button registration screen 500 in FIG. 5 are associated with each other in a manner illustrated in FIG. 14A and FIG. 14B.

FIG. 14A and FIG. 14B are tables indicating the correspondence between the source telephone numbers and the button names and the correspondence between the source telephone numbers and job identifiers (IDs), respectively. A table 1400 in FIG. 14A indicates the correspondence between the button names and the source telephone numbers, which are set on the button registration screen 500 in FIG. 5. The table 1400 in FIG. 14A may be stored in the eMMC 109 or may be stored in an external server or the like.

FIG. 14B is a table indicating the correspondence between the job IDs and the source telephone numbers. A table 1410 in FIG. 14B indicates the correspondence between the job IDs of the FAX reception jobs created in the flowchart illustrated in FIG. 8 and the source information (the telephone numbers) in the image data received in the jobs. The job ID may be an arbitrary value, such as enumeration of numbers or enumeration of alphabet letters, as long as the value is an identification number with which the job is uniquely distinguished.

The table 1410 in FIG. 14B may be stored in the eMMC 109 or may be stored in an external server or the like.

Although the source telephone numbers are stored in association with the job IDs in the first embodiment, the source telephone numbers may be stored in association with job names or the likes.

Referring back to FIG. 6, in Step S602, the CPU 101 determines whether the OK button 503 is selected. If the CPU 101 determines that the OK button 503 is selected (yes in Step S602), the process goes to Step S604. The process otherwise (no in Step S602) goes to Step S603.

In Step S603, the CPU 101 determines whether the Cancel button 504 is selected. If the CPU 101 determines that the Cancel button 504 is selected (yes in Step S603), the button registration process illustrated in FIG. 6 is terminated. The process otherwise (no in Step S603) goes back to Step S602 to repeat the steps.

In Step S604, the CPU 101 determines whether the setting of the preview reception mode is turned on. In the preview reception mode, the image data received in the FAX communication by the MFP 10 is not automatically printed with no operation by the user, but a preview image of the received data is displayed in the display unit 105 and the preview image is printed upon acceptance of selection by the user with the operation unit 107. The preview reception mode is set on a screen illustrated in FIG. 13.

FIG. 13 illustrates an example of a setting screen of the preview reception mode. A setting screen 1300 in FIG. 13 is displayed in the display unit 105 in the MFP 10 and accepts an operation with the operation unit 107. The setting screen 1300 may be displayed on the screen of a personal computer (PC) that has received a hypertext markup language (HTML) file received in hypertext transfer protocol (HTTP) communication from the MFP 10 and an operation on the PC may be accepted on the setting screen 1300.

An ON button 1301 and an OFF button 1302 are displayed on the setting screen 1300. The ON button 1301 is a button for turning on the setting of the preview reception mode of the MFP 10 upon selection by the user. When the ON button 1301 is selected, a setting value indicating that the preview reception mode is turned on is stored in the eMMC 109.

The OFF button 1302 is a button for turning off the setting of the preview reception mode of the MFP 10 upon selection by the user. When the OFF button 1302 is selected, a setting value indicating that the preview reception mode is turned off is stored in the eMMC 109.

The setting screen 1300 is a screen for changing the setting of the preview reception mode, which is a device setting of the MFP 10. The setting set on the setting screen 1300 is reflected regardless of the user who logs in. In addition, the setting set on the setting screen 1300 is reflected regardless of the job that is executed.

If the CPU 101 determines in Step S604 that the setting of the preview reception mode is turned on (yes in Step S604), the process goes to Step S606. The process otherwise (no in Step S604) goes to Step S605.

In Step S605, the CPU 101 turns on the preview reception mode. Specifically, the setting value indicating that preview reception mode is turned on is stored in the eMMC 109. A confirmation screen on which whether no problem occurs if the preview reception mode is turned on is confirmed to the user may be displayed in the display unit 105 when the preview reception mode is turned on.

In Step S606, the CPU 101 stores the button name and the source telephone number, the input of which is accepted in Step S601, in the eMMC 109.

Figure 4:
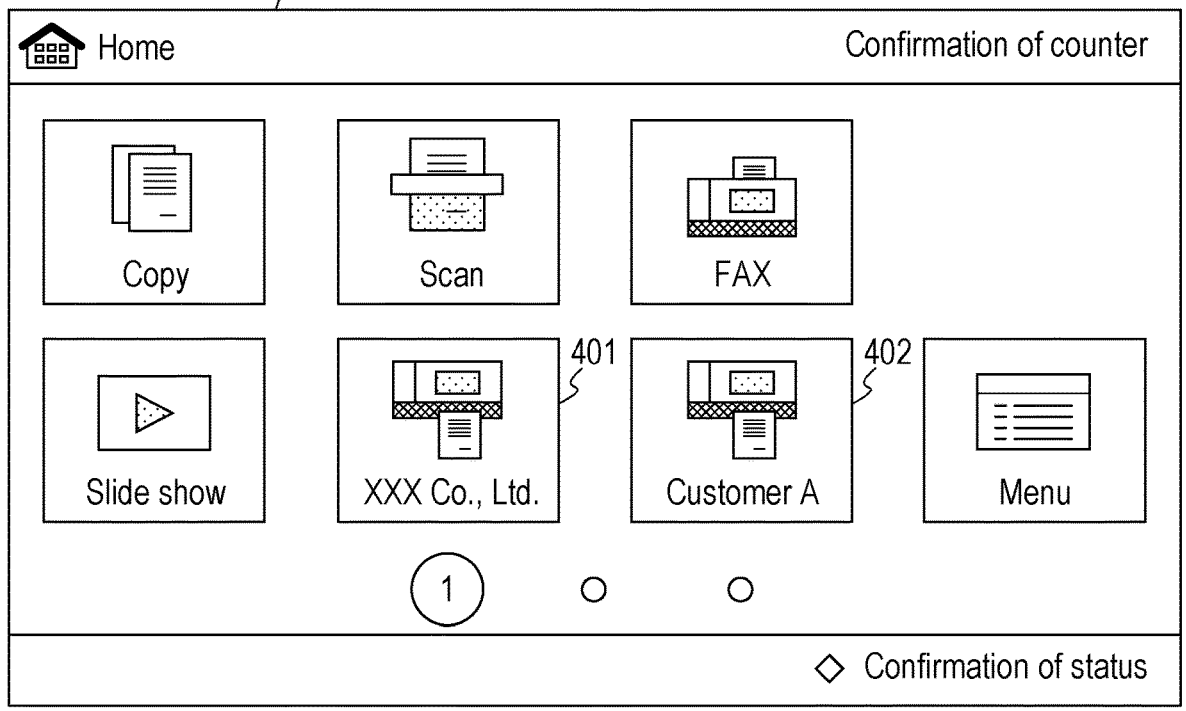
FIG. 4 illustrates an example of a home screen.

The button registered here is displayed on a home screen in FIG. 4. FIG. 4 illustrates an example of the home screen.

Referring to FIG. 4, a Home screen 400 is displayed in the display unit 105. A Copy button causing the MFP 10 to perform a copy function is displayed on the Home screen 400. In the copy function, the reading unit 111 reads an image of an original document to generate image data and the printing unit 113 prints an image on a sheet based on the generated image data. A Scan button causing the MFP 10 to perform a transmission function or a scanning process is also displayed on the Home screen 400. In the transmission function, the reading unit 111 reads an image of an original document to generate image data and the generated image data is transmitted. In the scanning process, the reading unit 111 reads an image of an original document to generate image data and the generated image data is stored in the eMMC 109. In addition, a FAX button for performing FAX transmission, a Menu button for setting various functions, and so on are displayed on the Home screen 400.

Furthermore, an "XXX Co., Ltd." button 401 and a "Customer A" button 402, which are objects (one touch buttons) created in the flowchart illustrated in FIG. 6, are displayed on the Home screen 400. Upon selection of the button 401 or 402 by the user, the printing unit 113 prints an image on a sheet based on FAX reception data transmitted from a source having the source telephone number coinciding with the source telephone number registered in advance in association with the button. For example, when the "XXX Co., Ltd." button 401 is selected, the printing unit 113 prints an image on a sheet based on the image data having the source telephone numbers "00-0000-0000" and "11-1111-111", which are set on the button registration screen 500 illustrated in FIG. 5. This process will be described in detail below with reference to FIG. 10.

The character strings "XXX Co., Ltd." and "Customer A" displayed on the button 401 and the button 402, respectively, are the button names input on the button registration screen 500 illustrated in FIG. 5.

Upon selection of the button 401 or 402, the process of the FAX one touch print described in detail with reference to FIG. 10 is performed.

Displaying the buttons for performing the FAX one touch print on the home screen in the above manner allows the received image data to be printed with reduced operation.

Figure 7:
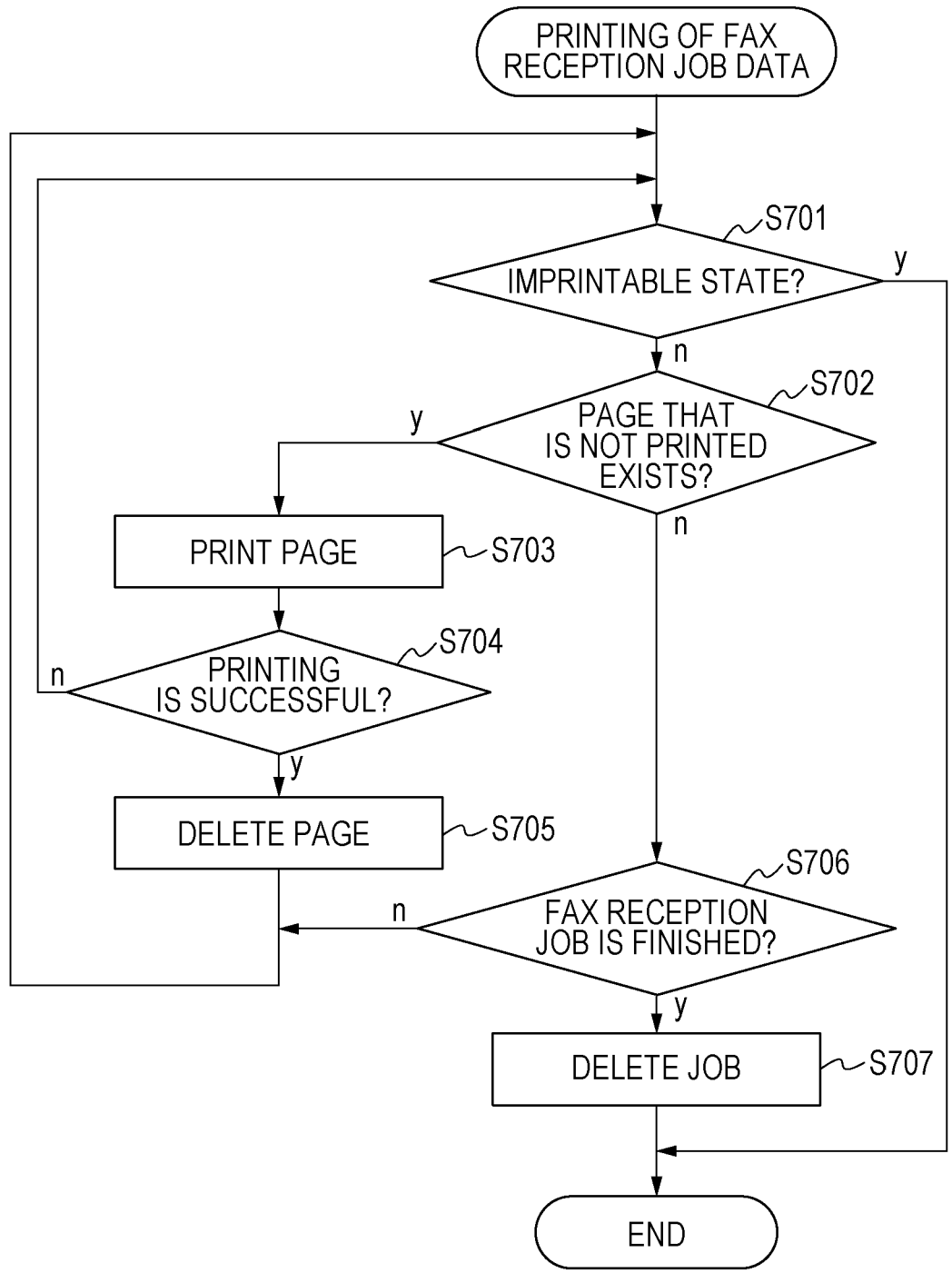
FIG. 7 is a flowchart illustrating an example of a process of printing FAX reception job data.

FIG. 7 is a flowchart illustrating an example of a process of printing FAX reception job data. The process in the flowchart illustrated in FIG. 7 is realized by the CPU 101, which reads out the program stored in the ROM 102 into the RAM 103 and executes the program. The flowchart illustrated in FIG. 7 is started upon execution of Step S903 in FIG. 9 or Step S1005 in FIG. 10 described below.

Referring to FIG. 7, in Step S701, the CPU 101 determines whether the MFP 10 is in an imprintable state. Specifically, for example, the CPU 101 determines whether a recording material, such as toner, remains, whether a paper jam occurs, or whether no recording paper remains. If the CPU 101 determines that the MFP 10 is in the imprintable state (yes in Step S701), the process illustrated in FIG. 7 is terminated. The process otherwise (no in Step S701) goes to Step S702. Specifically, if the MFP 10 is in at least one of the state in which the recording material, such as toner, does not remain, the state in which the paper jam occurs, and the state in which no recording paper remains, the CPU 101 determines that the MFP 10 is in the imprintable state. If the MFP 10 is not in the state in which the recording material, such as toner, does not remain, the state in which the paper jam occurs, and the state in which no recording paper remains, the CPU 101 determines that the MFP 10 is in a printable state.

In Step S702, the CPU 101 determines whether any page of the FAX reception data, which is not printed, exists. If the CPU 101 determines that any page of the FAX reception data, which is not printed, exists (yes in Step S702), the process goes to Step S703. The process otherwise (no in Step S702) goes to Step S706.

In Step S703, the CPU 101 controls the printing unit 113 and the printing unit 113 prints an image on a sheet based on the received image data (page).

In Step S704, the CPU 101 determines whether the printing is successful in Step S703. If the CPU 101 determines that the printing is successful (yes in Step S704), the process goes to Step S705. If the CPU 101 determines that the printing is not successful (no in Step S704), the process goes back to Step S701 to determine whether the CPU 101 is in the imprintable state again.

In Step S705, the CPU 101 deletes the image data (page) recorded in the eMMC 109 in Step S703.

In Step S706, the CPU 101 determines whether the FAX reception job is finished. If the CPU 101 determines that the FAX reception job is finished (yes in Step S706), the process goes to Step S707. The process otherwise (no in Step S706) goes back to Step S701 to repeat the steps.

In Step S707, the CPU 101 deletes the FAX reception job from the eMMC 109. Then, the process illustrated in FIG. 7 is terminated. When the button is associated with the received image data, the correspondence between the button and the image data is also deleted.

FIG. 8 is a flowchart illustrating an example of a process of storing the FAX reception data. The process in the flowchart illustrated in FIG. 8 is realized by the CPU 101, which reads out the program stored in the ROM 102 into the RAM 103 and executes the program. The flowchart illustrated in FIG. 8 is automatically started when a request for FAX reception is transmitted from the FAX apparatus 21 or the like to the MFP 10 over the PSTN 30.

Referring to FIG. 8, in Step S801, the CPU 101 stores a TSI signal that is received when the image data is received in the FAX communication in the eMMC 109. Information indicating the telephone number registered for the source is included in the TSI signal.

In Step S802, the CPU 101 stores the image data received in the FAX communication in the eMMC 109 according to a facsimile procedure. The image data is stored in the eMMC 109 in association with the received source telephone number. Here, the FAX reception job is created and the job ID is added to the FAX reception job.

The source telephone number may be stored in association with each piece of image data that is received or may be stored in association with each FAX reception job, as in the table 1410 in FIG. 14B.

In Step S803, the CPU 101 determines whether notification indicating that the image data about the next page exists is given according to the facsimile procedure. If the CPU 101 determines that the notification is given (yes in Step S803), the process goes back to Step S802 to repeat the steps.

In Step S804, the CPU 101 terminates the FAX reception job. Here, the FAX reception job is not deleted from the eMMC 109 and is held in the eMMC 109. Numbers are given to the FAX reception jobs in the order of storage and the FAX reception jobs to which the numbers are given are stored.

FIG. 9 is a flowchart illustrating an example of a process of controlling printing and recording of the FAX reception job data. The process in the flowchart illustrated in FIG. 9 is realized by the CPU 101, which reads out the program stored in the ROM 102 into the RAM 103 and executes the program. The process in the flowchart illustrated in FIG. 9 is started upon startup of the MFP 10, resides in the MFP 10, and constantly monitors the state of the FAX reception job at certain intervals.

Referring to FIG. 9, in Step S901, the CPU 101 determines whether the FAX reception job data for which the recording is not performed is stored in the eMMC 109. If the CPU 101 determines that the FAX reception job data for which the recording is not performed is stored in the eMMC 109 (yes in Step S901), the process goes to Step S902. The process otherwise (no in Step S901) goes back to Step S901.

In Step S902, the CPU 101 determines whether the setting of the MFP 10 is set to the preview reception mode. If the CPU 101 determines that the setting of the MFP 10 is set to the preview reception mode (yes in Step S902), the process goes to Step S904. The process otherwise (no in Step S902) goes to Step S903.

In Step S903, the CPU 101 performs printing of the FAX reception job data. Specifically, the CPU 101 performs the process illustrated in FIG. 7.

In Step S904, the CPU 101 displays a message indicating that the FAX reception job data is holding in the memory in the display unit 105. For example, a character string "receiving in memory" or "holding in memory" is displayed in the display unit 105.

FIG. 10 is a flowchart illustrating an example of the FAX one touch print process. The CPU 101 reads out the FAX print application 214 stored in the eMMC 109 into the RAM 103. Then, the CPU 101 executes the VM-FW unit 209 to interpret the process in the flowchart illustrated in FIG. 10, which is read out into the RAM 103. The process illustrated in FIG. 10 is started upon selection of the one touch button, such as the button 401 or 402.

Referring to FIG. 10, in Step S1001, the CPU 101 assigns one to a variable i. In Step S1002, the CPU 101 acquires the source telephone number of the i-th job in the ascending order of the numbers of the FAX reception jobs.

In Step S1003, the CPU 101 compares the source telephone number acquired in Step S1002 with the source telephone number registered in association with the button selected to start the flowchart illustrated in FIG. 10. Here, it is desirable to exclude spaces, signs, and so on other than the numbers from the targets of the comparison. In addition, an arbitrary number of trailing digits may be used as the targets of the comparison.

In Step S1004, the CPU 101 determines whether it is determined that the source telephone number acquired in Step S1002 coincides with the source telephone number registered in association with the button. If the CPU 101 determines that it is determined that the source telephone number acquired in Step S1002 coincides with the source telephone number registered in association with the button (yes in Step S1004), the process goes to Step S1005. The process otherwise (no in Step S1004) goes to Step S1006.

In Step S1005, the CPU 101 performs printing of the i-th FAX reception job data. Specifically, the flowchart illustrated in FIG. 7 is performed.

In Step S1006, the CPU 101 assigns i+1 to the variable i. In Step S1007, the CPU 101 determines whether the comparison in Step S1003 is finished for all the FAX reception jobs stored in the eMMC 109. If the CPU 101 determines that the comparison is finished for all the FAX reception jobs (yes in Step S1007), the process goes to Step S1008. The process otherwise (no in Step S1007) goes back to Step S1002 to repeat the steps.

In Step S1008, the CPU 101 does not display the button selected by the user on the Home screen 400 upon finishing of the execution of the job (printing of the image data) corresponding to the button selected by the user. When the image data is received from the apparatus having the source telephone number corresponding to the button in the FAX communication, the button is displayed on the Home screen 400 again.

Performing the above process allows the operation by the user concerning the instruction to print the received image data to be reduced.

In addition, since the printing and the selection of the print target are capable of being performed with one operation when a function selection screen, such as the home screen, is displayed, it is possible to reduce the operation by the user.

Furthermore, since the buttons that are selected after the job corresponding to the button selected by the user is executed are not displayed, many registered buttons are not displayed on the home screen and the operation to select the button by the user is not troublesome.

Although the FAX print application 214 is described as an extension application in the first embodiment, the FAX print application 214 may be stored in the ROM 102 in advance at shipment from the factory.

Furthermore, although the example is described in the first embodiment in which the preview reception mode is turned on when the one touch button is registered, the first embodiment is not limited to this. For example, only when the preview reception mode is turned on, registration of the one touch button may be accepted.

Furthermore, in the first embodiment, when the login function of each user is set to ON, the button registered by the user may be displayed on the home screen only when the user who has registered the button logs in or may be displayed also when an arbitrary user logs in.

Furthermore, although it is necessary to turn on the preview reception mode to print the image data received in the FAX communication upon selection of the one touch button in the first embodiment, the FAX reception data may be printed in response to an operation by the user using a dedicated reception setting. For example, a setting may be used, which switches the turning on and off of the one touch FAX reception function.

Second Embodiment

The example is described in the first embodiment in which the one touch button is registered upon acceptance of an operation by the user. An example is described in the second embodiment in which the button is automatically created based on the source telephone number included in the TSI signal.

Figure 11:
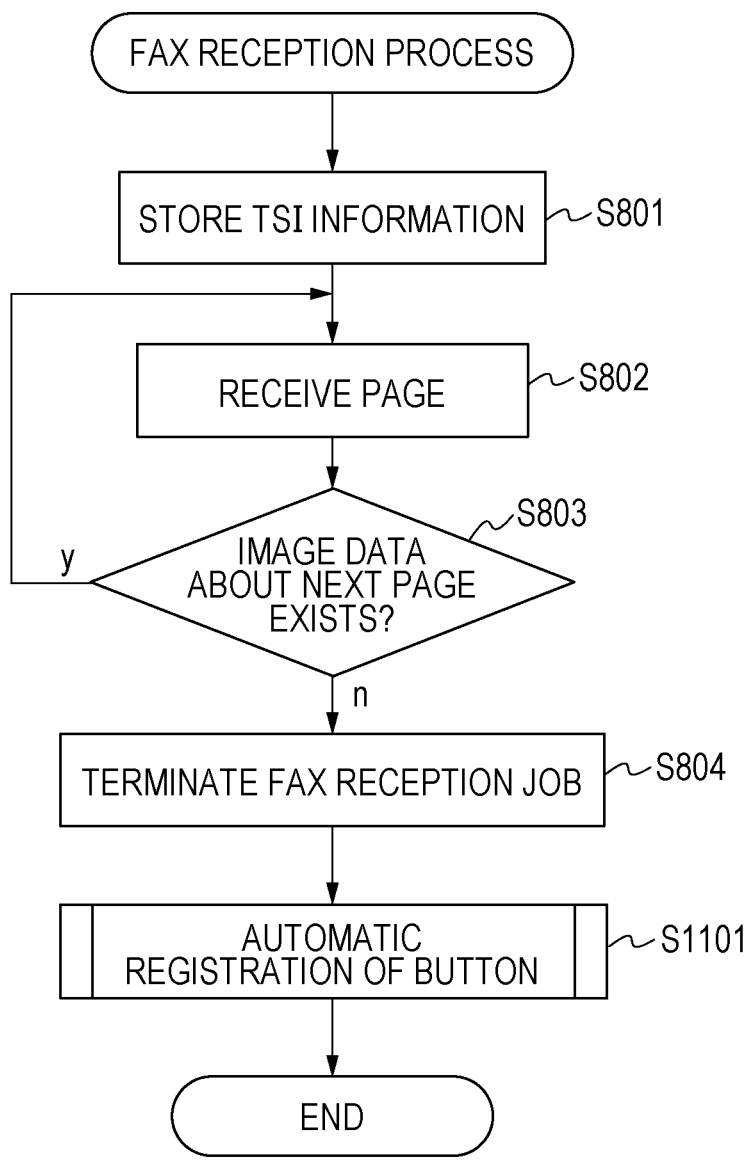
FIG. 11 is a flowchart illustrating an example of a FAX reception process in which a button is automatically registered in the MFP.

FIG. 11 is a flowchart illustrating an example of a FAX reception process in which the button is automatically registered in the MFP 10. The process in the flowchart illustrated in FIG. 11 is realized by the CPU 101, which reads out the program stored in the ROM 102 into the RAM 103 and executes the program.

Steps from S801 to S804 are the same as those in the process illustrated in FIG. 8, described in the first embodiment.

In Step S1101, the CPU 101 performs automatic registration of the button. Specifically, the CPU 101 performs a process illustrated in FIG. 12.

Figure 12:
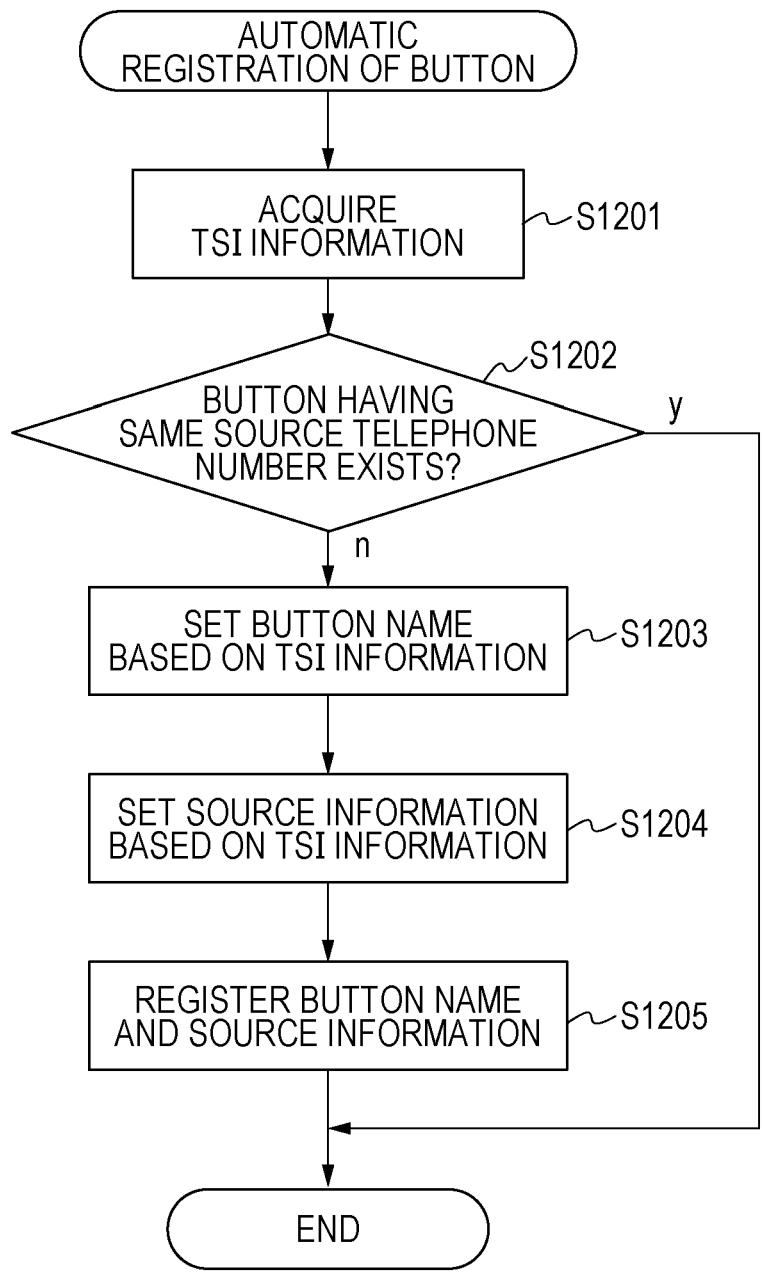
FIG. 12 is a flowchart illustrating an example of a process of automatically registering a button.

FIG. 12 is a flowchart illustrating an example of a process of automatically registering a button. The process in the flowchart illustrated in FIG. 12 is realized by the CPU 101, which reads out the program stored in the ROM 102 into the RAM 103 and executes the program.

Referring to FIG. 12, in Step S1201, the CPU 101 reads out the source telephone number stored in Step S801 from the eMMC 109.

In Step S1202, the CPU 101 compares the source information about the button that has been registered with the source telephone number read out in Step S1201 to determine whether the button having the same source telephone number exists. If the CPU 101 determines that the button having the same source telephone number exists (yes in Step S1202), the process of automatically registering a button is terminated. If the CPU 101 determines that the button having the same source telephone number does not exist (no in Step S1202), the process goes to Step S1203.

In Step S1203, the CPU 101 sets the button name based on the source telephone number that is read out. For example, the last four digits of the source telephone number is set as the button name. It is possible to automatically set the button name having a higher flexibility if the MFP 10 is configured so that an arbitrary number of digits can be set.

In Step S1204, the CPU 101 sets the source information based on the source telephone number that is read out. For example, all the digits of the source telephone number are set as the source information. The MFP 10 may be configured so that an arbitrary number of digits can be set.

In Step S1205, the CPU 101 stores the button name set in Step S1203 and the source information set in Step S1204 in the eMMC 109 as the button information.

Configuring the MFP 10 in the manner described above allows the button to be automatically registered based on the received TSI information. The operation by the user is not required to perform the registration of the button described in the first embodiment, thus taking less effort.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-101782, filed on May 30, 2019, which is hereby incorporated by reference herein in its entirety.

What is claimed is:

1. An image forming apparatus comprising:
a display;
a communicator that receives a plurality of print jobs from an external apparatus;
a controller; and
a storage that stores the received plurality of print jobs, wherein the stored plurality of print jobs are not executed by the controller until an instruction for printing is received after the plurality of print jobs are stored in the storage,
wherein the controller displays, on the display, a button with which attribute information is associated for specifying one or more print jobs as an executing target from among the stored plurality of print jobs, wherein the button is able to be displayed on the display from before a print job having the attribute information associated with the button is received by the communicator,
wherein, based on operation of the button by a user as the instruction for printing, the controller executes one or more print jobs that are specified by the controller, using the attribute information associated with the operated button, as the executing target from among the plurality of print jobs that have been stored in the storage before the operation of the button button, and
wherein the controller executes the specified one or more print jobs without selection of the specified one or more print jobs as the executing target by the user.

2. The image forming apparatus according to claim 1, further comprising:
a copy function for reading an image of an original document and for printing the read image of the original document; and
a transmission function for reading an image of an original document, for generating image data, and for transmitting the generated image data,
wherein the controller displays, on the display, the button on a function selection screen on which a function, used by the user, is selected from a plurality of functions including the copy function and the transmission function.

3. The image forming apparatus according to claim 1, wherein the attribute information is transmission source information.

4. The image forming apparatus according to claim 1, wherein the controller receives designation of a name of the button and sets the designated name of the button.

5. The image forming apparatus according to claim 4, wherein the controller displays, on the display, the designated name of the button set by the controller.

6. The image forming apparatus according to claim 3, wherein the transmission source information is a telephone number of a transmission source indicated by a transmitting station information (TSI) signal received by the communicator in facsimile (FAX) communication.

7. A method of controlling an image forming apparatus having a display, the method comprising:
receiving a plurality of print jobs from an external apparatus;
storing the received plurality of print jobs, wherein the stored plurality of print jobs are not executed until an instruction for printing is received after the plurality of print jobs are stored;
displaying, on the display, a button with which attribute information is associated for specifying one or more print jobs as an executing target from among the stored plurality of print jobs, wherein the button is able to be displayed on the display from before a print job having the attribute information associated with the button is received; and
executing, based on operation of the button by a user as the instruction for printing, one or more print jobs that are specified, using the attribute information associated with the operated button, as the executing target from among the plurality of print jobs that have been stored before the operation of the button,
wherein executing includes executing the specified one or more print jobs without selection of the specified one or more print jobs as the executing target by the user.

8. The method according to claim 7,
wherein the image forming apparatus includes a copy function and a transmission function,
wherein the copy function is for reading an image of an original document and for printing the read image of the original document, and the transmission function is for reading an image of an original document, for generating image data, and for transmitting the generated image data, and
wherein displaying includes displaying, on the display, the button on a function selection screen on which a function, used by the user, is selected from a plurality of functions including the copy function and the transmission function.

9. The method according to claim 7, wherein the attribute information is transmission source information.

10. The method according to claim 7, the method further comprising:
receiving designation of a name of the button; and
setting the designated name of the button.

11. The method according to claim 10, wherein displaying includes displaying, on the display, the set designated name of the button.

12. The method according to claim 9, wherein the transmission source information is a telephone number of a transmission source indicated by a transmitting station information (TSI) signal received in facsimile (FAX) communication.

13. A non-transitory computer-readable storage medium storing a program to cause a computer to perform a method of controlling an image forming apparatus having a display, the method comprising:
receiving a plurality of print jobs from an external apparatus;
storing the received plurality of print jobs, wherein the stored plurality of print jobs are not executed until an instruction for printing is received after the plurality of print jobs are stored;
displaying, on the display, a button with which attribute information is associated for specifying one or more print jobs as an executing target from among the stored plurality of print jobs, wherein the button is able to be displayed on the display from before a print job having the attribute information associated with the button is received; and executing, based on operation of the button by a user as the instruction for printing, one or more print jobs that are specified, using the attribute information associated with the operated button, as the executing target from among the plurality of print jobs that have been stored before the operation of the button, wherein executing includes executing the specified one or more print jobs without selection of the specified one or more print jobs as the executing target by the user.

\* \* \* \* \*